May 23, 1933.  C. A. PERSONS  1,910,635

SPLASH GUARD FOR VEHICLE FENDERS

Filed Sept. 18, 1931

Inventor
Charles A. Persons
By Owen W. Kennedy
Attorney

Patented May 23, 1933

1,910,635

UNITED STATES PATENT OFFICE

CHARLES A. PERSONS, OF WORCESTER, MASSACHUSETTS, ASSIGNOR TO PERSONS-MAJESTIC MANUFACTURING COMPANY, OF WORCESTER, MASSACHUSETTS, A CORPORATION OF MASSACHUSETTS

SPLASH GUARD FOR VEHICLE FENDERS

Application filed September 18, 1931. Serial No. 563,524.

The present invention relates to splash guards that are adapted for attachment to the rear fenders of motor vehicles, in order to intercept tar, sand, or other road material thrown up by the wheels when the vehicle is in motion, thereby to prevent defacement of the rear portion of the vehicle by said road material.

According to the present invention, the spring or resiliency of the material from which the splash guard or curtain is made provides the force that secures the device to the vehicle fender or mud guard,—thereby greatly simplifying the attachment of the device, and avoiding the use of screws, clamps, springs, and other metallic fastening means. Other and further objects of the invention will be apparent from the following detailed description thereof, taken in connection with the accompanying illustrative drawing, in which—

Like reference characters refer to like parts in the different figures.

Figure 1:
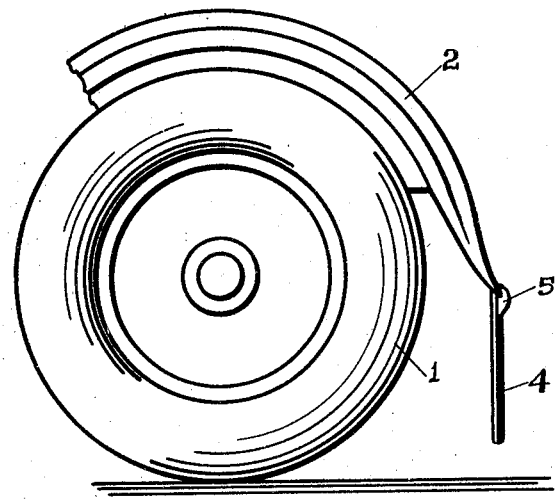
Fig. 1 is a view in side elevation of a motor vehicle wheel having an overhanging fender or mud guard equipped with a splash curtain embodying my invention.
Figure 2:
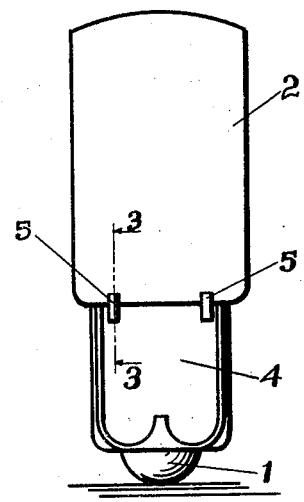
Fig. 2 is a view in rear end elevation of the parts shown in Fig. 1.

Referring first to Figs. 1 and 2, the numeral 1 indicates the rear wheel of a vehicle, said wheel being overhung by the usual fender or mud guard 2. The latter, as shown, may be of the usual crowned type, and its rear lower edge may be turned in more or less, as shown in Fig. 3, to provide a transverse bead 3, although the presence of this bead is not essential to the attachment of the splash guard of my invention.

Said splash guard is here shown in the form of a sheet or apron 4 of molded rubber, or like resilient flexible material, adapted to be attached by its upper edge to the rear lower edge of the mud guard 2, so as to constitute, as shown in Figs. 1 and 2, an extension of said mud guard. In order to obtain the ready attachment of the device, the latter is so molded as to provide on one face (as here in shown, the rear or outer face) a plurality of integral protuberances 5, 5, in close proximity to its upper edge. In molding the rubber apron 4 and its protuberances 5, 5, the material of each of the latter is caused to embed a metallic fender-engaging device 6, here shown as consisting of an elongated arm 7, to which is pivoted, by pin 8, an L-shaped arm 9. The parallel portions of the arms 7 and 9 are substantially coextensive, the arm 7 at its upper extremity being formed with a hook or projection 10 that reduces the width of the gap or spacing between the arms 7 and 9 at this point.

Figures 3, 5:
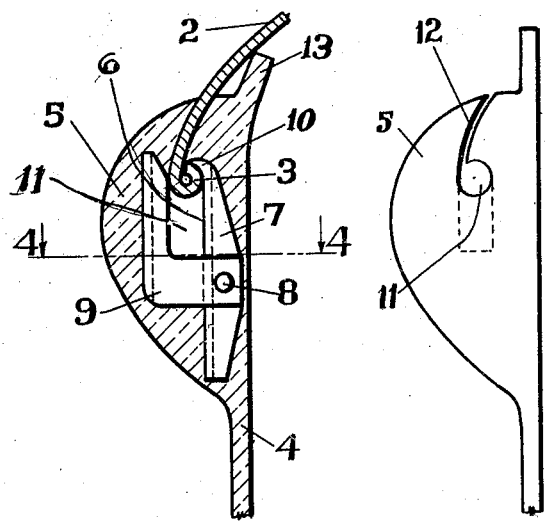
Fig. 3 is a large scale sectional view on the line 3—3 of Fig. 2.
Fig. 5 is a large scale fragmentary edge view of my improved device, detached from the mud guard.
Figure 4:
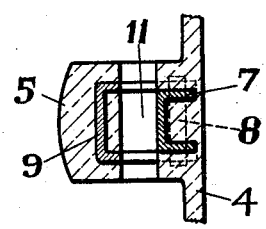
Fig. 4 is a sectional view on the line 4—4 of Fig. 3.

The material of each protuberance 5, having so embedded therein the device 6, is cut away and removed, as shown at 11, between the opposing parallel portions of arms 7 and 9, and a cut or slit 12, Fig. 5, is made in the material of said protuberance, running from the upper portion of its outer surface to the restricted entrance to space 11. In the operation of applying the apron 4 to a mud guard or fender 2, the slits 12, 12 of protuberances 5, 5 are registered with the lower edge of said mud guard, this involving the disposal of the apron's upper edge 13 beneath the mud guard, and the application of sufficient outward pull on the protuberances 5, 5 so distorts them, as to open the slits 12, 12 for the passage therethrough of the mud guard's lower edge, as shown in Fig. 3. Said lower edge, by pushing upwardly on the protuberances 5, 5, eventually enters the space 11, and the bead 3 of said edge, upon the discontinuance of the stretching or distorting force on the protuberances, drops in behind the hooks or shoulders 10, 10 of arms 7, 7. In this way, by the resilience or spring inherent in the material of the apron, the embedded fender-engaging devices 6, 6 are maintained in tight gripping engagement with said fender, preventing any accidental dislodgement of the apron.

I claim,

1. A splash guard for motor vehicle fenders, providing an edge bead, said guard comprising opposed pivotally connected clamping members adapted to engage the fender bead, for the attachment thereto of said guard, said clamping members being pressed together by the inherent spring of the material of said guard.

2. A splash guard for motor vehicle fenders, providing an edge bead, said guard comprising opposed pivotally connected clamping members adapted to engage the fender bead, for the attachment thereto of said guard, said clamping members being embedded in said guard and receiving their retaining force solely from the inherent resiliency of the embedding material.

3. In a splash guard assembly for attachment to that portion of a vehicle fender having an edge bead, a guard member composed of resilient flexible material providing a pair of spaced integrally formed protuberances in each of which is embedded opposed pivotally connected metallic clamping members, the inherent resiliency of the guard material serving to yieldingly maintain said clamping members in engagement with the fender bead to oppose removal of said guard from the fender.

CHARLES A. PERSONS.